United States Patent
Lee

(10) Patent No.: US 12,350,226 B2
(45) Date of Patent: Jul. 8, 2025

(54) DRIVING MODULE AND MOTION ASSIST APPARATUS INCLUDING THE SAME

(71) Applicant: KOREA INSTITUTE OF SCIENCE AND TECHNOLOGY, Seoul (KR)

(72) Inventor: Jongwon Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 140 days.

(21) Appl. No.: 18/307,751

(22) Filed: Apr. 26, 2023

(65) Prior Publication Data
US 2024/0082099 A1 Mar. 14, 2024

(30) Foreign Application Priority Data

Jul. 20, 2022 (KR) .......................... 10-2022-0089560

(51) Int. Cl.
| | |
|---|---|
| *F16H 1/28* | (2006.01) |
| *A61H 1/02* | (2006.01) |
| *A61H 3/00* | (2006.01) |
| *F16H 57/02* | (2012.01) |
| *H02K 7/116* | (2006.01) |
| *H02K 7/08* | (2006.01) |

(52) U.S. Cl.
CPC ............. *A61H 3/00* (2013.01); *A61H 1/0244* (2013.01); *F16H 1/28* (2013.01); *F16H 57/02* (2013.01); *H02K 7/116* (2013.01); *A61H 2201/1215* (2013.01); *A61H 2201/1472* (2013.01); *F16H 2057/02034* (2013.01); *F16H 2057/02039* (2013.01); *H02K 7/08* (2013.01)

(58) Field of Classification Search
CPC ...... A61H 3/00; A61H 1/0244; A61H 1/0262; A61H 2201/1215; A61H 2201/1472; A61H 2201/1642; A61H 2201/1652; F16H 1/28; F16H 1/36; F16H 57/02; F16H 2057/02034; F16H 2057/02039; F16H 57/021; F16H 57/023; H02K 7/116; H02K 7/08; B25J 9/0006
See application file for complete search history.

(56) References Cited

U.S. PATENT DOCUMENTS

| | | | |
|---|---|---|---|
| 10,500,069 | B2 | 12/2019 | Roh |
| 10,746,272 | B2 | 8/2020 | Lee et al. |
| (Continued) | | | |

FOREIGN PATENT DOCUMENTS

| | | |
|---|---|---|
| CN | 112109113 A | 12/2020 |
| JP | 2015-150928 A | 8/2015 |
| (Continued) | | |

*Primary Examiner* — Farhana Pervin

(57) ABSTRACT

Provided is a driving module including: a driving source for generating power; a ring gear disposed coaxially with the driving source; and a gear train disposed between the driving source and the ring gear. Here, the gear train includes: a first gear set of which at least a portion is inserted into the driving source; and a second gear set, the first gear set includes: a sun gear coupled to the driving source to rotate by power transmitted from the driving source; and a first planetary gear engaged with the sun gear to revolve around the sun gear, the second gear set includes a second planetary gear fixed and coupled onto the first planetary gear at a side opposite to the driving source, and the second planetary gear is engaged with the ring gear.

18 Claims, 11 Drawing Sheets

(56) References Cited

U.S. PATENT DOCUMENTS

| | | | |
|---|---|---|---|
| 10,952,915 B2 | 3/2021 | Roh | |
| 11,703,109 B2 * | 7/2023 | Kim | F16H 1/28 475/341 |
| 11,888,378 B1 * | 1/2024 | Bonny | H02K 7/116 |
| 2006/0247089 A1 * | 11/2006 | Guo | F16H 1/28 475/338 |
| 2015/0094186 A1 * | 4/2015 | Bang | F16H 3/663 475/286 |
| 2016/0106615 A1 * | 4/2016 | Lee | A61H 3/00 414/4 |
| 2017/0128234 A1 * | 5/2017 | Roh | F16H 57/0006 |
| 2018/0051775 A1 * | 2/2018 | Liang | F16H 1/46 |
| 2019/0021932 A1 * | 1/2019 | Roh | A61H 3/00 |
| 2022/0205516 A1 * | 6/2022 | Ta | F16H 57/08 |
| 2023/0417322 A1 * | 12/2023 | Roussel | F16H 61/32 |

FOREIGN PATENT DOCUMENTS

| | | |
|---|---|---|
| KR | 10-2012-0088389 A | 8/2012 |
| KR | 10-2016-0085109 A | 7/2016 |
| KR | 10-2017-0053020 A | 5/2017 |
| KR | 10-2018-0027247 A | 3/2018 |
| KR | 10-1949174 B1 | 2/2019 |

* cited by examiner

DRIVING MODULE AND MOTION ASSIST APPARATUS INCLUDING THE SAME

CROSS-REFERENCE TO RELATED APPLICATIONS

This U.S. non-provisional patent application claims priority under 35 U.S.C. § 119 of Korean Patent Application No. 10-2022-0089560, filed on Jul. 20, 2022, the entire contents of which are hereby incorporated by reference.

BACKGROUND

The present disclosure herein relates to a driving module and a motion assist apparatus including the same, and more particularly, to a driving module capable of being miniaturized and obtaining a high reduction gear ratio and a motion assist apparatus including the same.

Various kinds of motion assist apparatuses may be used to assist motion of people who have abnormalities in some functions of human bodies. For example, a walking assist apparatus may be used to assist walking of people who have difficulties in walking. The walking assist apparatus may be worn on legs of the human body. The walking assist apparatus may transmit driving force to the legs when the legs move. To this end, the walking assist apparatus may include a driving module. The driving module may include a driving source such as a motor. Power produced from the driving source may be transmitted to the human body through a reduction gear.

SUMMARY

The present disclosure provides a driving module capable of being reduced in volume for miniaturization and a motion assist apparatus including the same.

The present disclosure also provides a driving module capable of being reduced in weight and a motion assist apparatus including the same.

The present disclosure also provides a driving module capable of obtaining a high reduction gear ratio and a motion assist apparatus including the same.

The object of the present invention is not limited to the aforesaid, but other objects not described herein will be clearly understood by those skilled in the art from descriptions below.

An embodiment of the inventive concept provides a driving module including: a driving source configured to generate power; a ring gear disposed coaxially with the driving source; and a gear train disposed between the driving source and the ring gear. Here, the gear train includes: a first gear set of which at least a portion is inserted into the driving source; and a second gear set, the first gear set includes: a sun gear coupled to the driving source to rotate by power transmitted from the driving source; and a first planetary gear engaged with the sun gear to revolve around the sun gear, the second gear set includes a second planetary gear fixed and coupled onto the first planetary gear at a side opposite to the driving source, and the second planetary gear is engaged with the ring gear.

In an embodiment, the second planetary gear may have a diameter greater than that of the first planetary gear.

In an embodiment, the first planetary gear and the second planetary gear may be disposed coaxially with each other.

In an embodiment, the number of sawteeth of the second planetary gear may be greater than that of sawteeth of the first planetary gear.

In an embodiment, the driving source may include: a driving source housing; a stator disposed in the driving source housing; a rotor disposed in the stator to provide an inner space through which an axis passes; and a driving shaft disposed in the inner space and connected to the rotor to rotate. Here, at least a portion of the first gear set may be disposed in the inner space, and the sun gear may be coupled to the driving shaft to rotate.

In an embodiment, the driving module may further include an intermediate ring gear disposed between the driving source and the ring gear and fixed and coupled to the driving source housing, and the first planetary gear may be engaged with the intermediate ring gear.

In an embodiment, the intermediate ring gear may include: an intermediate plate that provides an arrangement hole through which the axis passes; and an intermediate gear body that is coupled to an inner side of the intermediate plate and provides an intermediate sawtooth structure engaged with the first planetary gear. Here, the intermediate gear body may have a diameter equal to or less than that of the inner space, and at least a portion of the intermediate gear body may be inserted into the inner space.

In an embodiment, the driving module may further include: an external housing disposed coaxially with the ring gear to surround the ring gear; and a first bearing disposed between the external housing and the ring gear. Here, the external housing may be fixed and coupled to the driving source housing.

In an embodiment, each of the first planetary gear and the second planetary gear may be provided in plurality.

In an embodiment of the inventive concept, a motion assist apparatus includes: a fixing module fixed to one portion of a body of a user; a support module configured to support the other portion of the body of the user and rotate with respect to the fixing module; and a driving module having one side coupled to the fixing module and the other side coupled to the support module. Here, the driving module includes: a driving source; and a gear train coupled to the driving source, the gear train includes: a first gear set of which at least a portion is inserted into the driving source; and a second gear set disposed at the outside of the driving source, the first gear set includes: a sun gear coupled to the driving source coaxially with the driving source; and a first planetary gear configured to revolve around the sun gear, and the second gear set includes a second planetary gear coupled onto the first planetary gear at a side opposite to the driving source.

In an embodiment, the driving module may further include a ring gear disposed coaxially with the driving source. Here, the second planetary gear may be engaged with the ring gear, and the support module may be fixed and coupled to the ring gear.

In an embodiment, the driving source may include: a driving source housing; a stator disposed in the driving source housing; a rotor disposed in the stator to provide an inner space through which an axis passes; and a driving shaft disposed in the inner space and connected to the rotor to rotate. Here, the fixing module may be fixed and coupled to the driving source housing.

In an embodiment, at least a portion of the first gear set may be disposed in the inner space, and the sun gear may be coupled to the driving shaft to rotate.

In an embodiment, the motion assist apparatus may further include: an external housing disposed coaxially with the ring gear to surround the ring gear; and a first bearing disposed between the external housing and the ring gear. Here, the external housing may be fixed and coupled to the driving source housing.

In an embodiment, the driving module may further include an intermediate ring gear disposed between the driving source and the ring gear and fixed and coupled to the driving source housing, and the first planetary gear may be engaged with the intermediate ring gear.

In an embodiment, the second planetary gear may have a diameter greater than that of the first planetary gear.

In an embodiment of the inventive concept, a driving module includes: a driving source having an axis extending in a first direction; a ring gear configured to rotate around the axis; and a gear train disposed between the driving source and the ring gear. Here, the gear train includes: a first planetary gear of which at least a portion is inserted into the driving source; and a second planetary gear coupled onto the first planetary gear at a side opposite to the driving source. Also, the first planetary gear revolves around the axis by the driving source, and the second planetary gear is engaged with the ring gear to revolve around the axis together with the first planetary gear.

In an embodiment, the second planetary gear may have a diameter greater than that of the first planetary gear.

In an embodiment, the driving source may include: a driving source housing; a stator disposed in the driving source housing; a rotor configured to rotate with respect to the stator and provide an inner space through which the axis passes; and a driving shaft extending in the first direction on the axis. Here, at least a portion of the first planetary gear may be disposed in the inner space, and the first planetary gear may revolve around the driving shaft.

In an embodiment, the driving module may further include an intermediate ring gear disposed between the driving source and the ring gear and fixed and coupled to the driving source housing, and the first planetary gear may be engaged with the intermediate ring gear.

Particularities of other embodiments are included in the detailed description and drawings.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
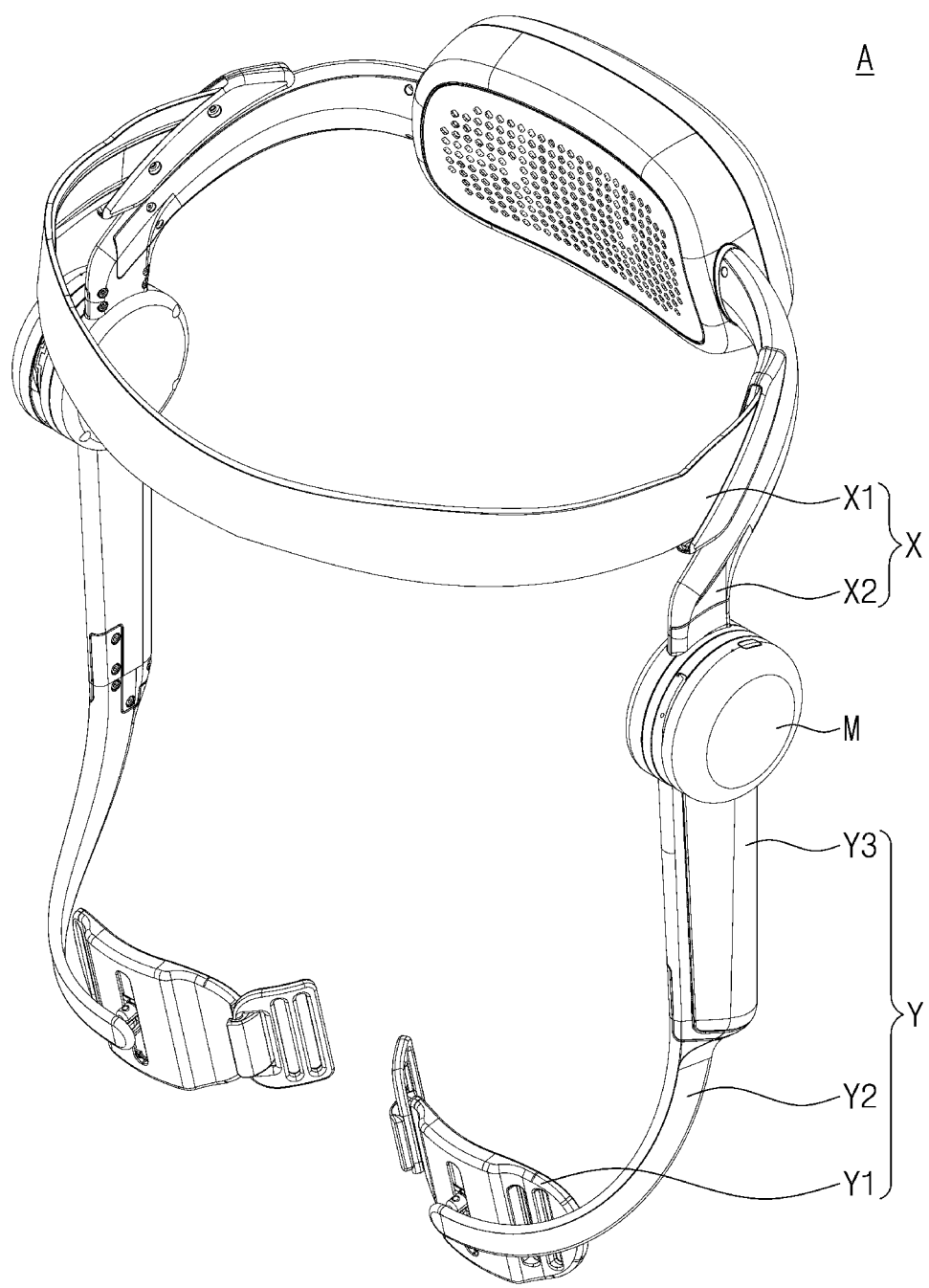
FIG. 1 is a perspective view illustrating a motion assist apparatus according to embodiments of the inventive concept.

Hereinafter, embodiments of the present invention will be described with reference to the accompanying drawings. Like reference numerals refer to like elements throughout.

FIG. 1 is a perspective view illustrating a motion assist apparatus according to embodiments of the inventive concept.

Referring to FIG. 1, a motion assist apparatus A may be provided. The motion assist apparatus A may assist a movement of a user. For example, the motion assist apparatus A may assist a walking of the user. In this case, the motion assist apparatus A may include a fixing module X, a support module Y, and a driving module M.

The fixing module X may be fixed to a portion of a body of the user. For example, the fixing module X may be fixed to a waist of the user or the like. To this end, the fixing module X may include a fixing band X1 and a fixing coupling part X2. The fixing band X1 may surround the waist of the user. The fixing coupling part X2 may couple the fixing band X1 to the driving module M. For example, the fixing coupling part X2 may be coupled to one side of the driving module M. A detailed description thereof will be described later.

The support module Y may support the other portion of the body of the user. For example, the support module Y may support a leg of the user. The support module Y may move with respect to the fixing module X. More specifically, the support module Y may rotate around the fixing module X. The support module Y may include a support band Y1, a support connection part Y2, and a support coupling part Y3. The support band Y1 may surround a knee of the user. The support connection part Y2 may couple the support band Y1 to the support coupling part Y3. The support coupling part Y3 may couple the support band Y1 and the support connection part Y2 to the driving module M. For example, the support coupling part Y2 may be coupled to the other side of the driving module M. A detailed description thereof will be described later.

The driving module M may connect the fixing module X and the support module Y. For example, the driving module M may have one side coupled to the fixing module X and the other side coupled to the support module Y. The driving module M may allow the support module Y to rotate around the fixing module X. That is, when the driving module M operates, the support module Y may rotate with respect to the fixing module X that is fixed by using the driving module M as a center. A detailed description on the driving module M will be described later.

Although a case in which the motion assist apparatus A assists the walking of the user is described hereinabove, the embodiment of the inventive concept is not limited thereto. For example, the motion assist apparatus A may assist a movement of an arm of the user or the like. Also, the driving module M according to embodiments of the inventive concept may be applied to other structures instead of the motion assist apparatus A. Hereinafter, however, a case in which the driving module M is applied to the motion assist apparatus A assisting the walking of the user will be described.

Figure 2:
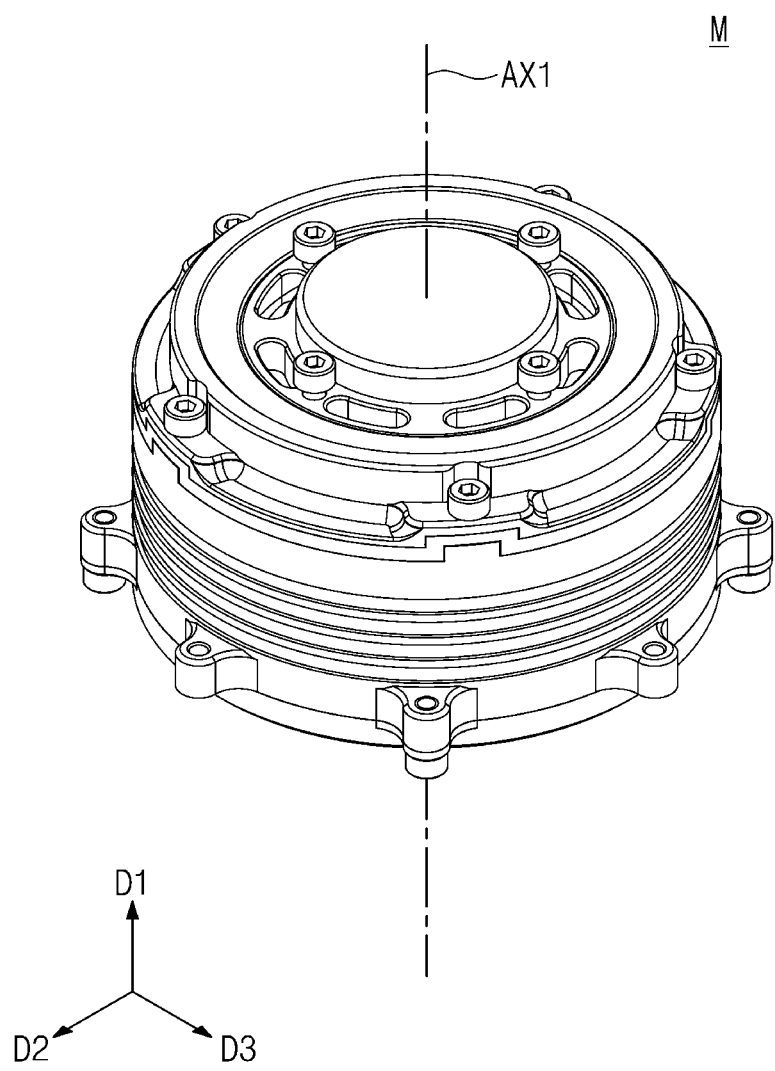
FIG. 2 is a perspective view illustrating a driving module according to embodiments of the inventive concept.
Figure 3:
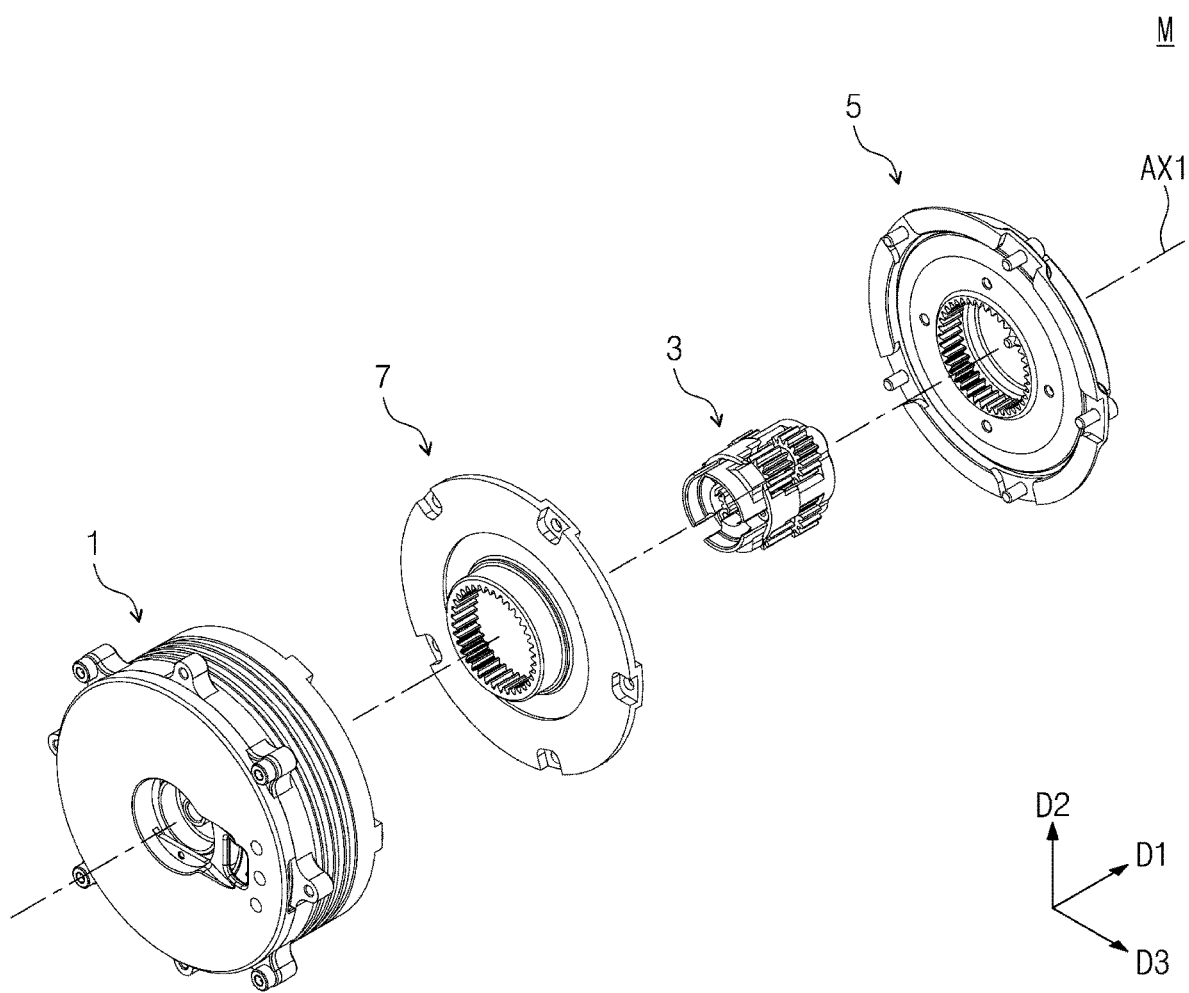
FIG. 3 is a partial exploded perspective view illustrating the driving module according to embodiments of the inventive concept.

FIG. 2 is a perspective view illustrating the driving module according to embodiments of the inventive concept, and FIG. 3 is a partial exploded perspective view illustrating the driving module according to embodiments of the inventive concept.

Hereinafter, D1 may be referred to as a first direction, D2 crossing the first direction D1 may be referred to as a second direction, and D3 crossing each of the first direction D1 and the second direction D2 may be referred to as a third direction.

Referring to FIGS. 2 and 3, the driving module M may have an axis AX1 extending in the first direction D1. A portion of the driving module M may rotate around the axis AX1. To this end, the driving module M may include a driving source 1, a ring gear assembly 5, a gear train 3, and an intermediate ring gear 7.

The driving source 1 may allow at least a portion of each of the gear train 3 and the ring gear assembly 5 to rotate. For example, the driving source 1 may be a motor that converts electrical energy into rotational energy. The fixing module X (refer to FIG. 1) may be coupled to one side of the driving module 1. A detailed description of the driving source 1 will be described later with reference to FIG. 4.

The ring gear assembly 5 may be disposed coaxially with the driving source 1. For example, when the driving source 1 is disposed on the axis AX1, the ring gear assembly 5 may be also disposed on the axis AX1. The ring gear assembly 5 may be coupled to the driving source 1. At least a portion of the ring gear assembly 5 may rotate around the driving source 1. More specifically, at least a portion of the ring gear assembly 5 may rotate around the axis AX1 based on the driving source 1. The support module Y (refer to FIG. 1) may be coupled to one side of the ring gear assembly 5. The support module Y may rotate relatively to the fixing module X by rotation of the ring gear assembly 5. A detailed description on the ring gear assembly 5 will be described later.

The gear train 3 may transmit power transmitted from the driving source 1 to the ring gear assembly 5. The gear train 3 may be disposed between the driving source 1 and the ring gear assembly 5. The gear train 3 may have one side coupled to the driving source 1 and the other side coupled to the ring gear assembly 5. At least a portion of the gear train 3 may be disposed in the driving source 1. That is, at least a portion of the gear train 3 may be inserted into the driving source 1. A detailed description on the gear train 3 will be described later.

The intermediate ring gear 7 may be disposed between the driving source 1 and the ring gear assembly 5. A portion of the gear train 3 may be engaged with the intermediate ring gear 7. The intermediate ring gear 7 may be coupled to the driving source 1. More specifically, the intermediate ring gear 7 may be coupled and fixed to an outer side of the driving source 1. A detailed description thereof will be described later.

The driving source 1, the intermediate ring gear 7, and the ring gear assembly 5 may be collectively referred to as a reduction gear. In this case, the driving module M may include the driving source 1 and the reduction gear.

Figure 4:
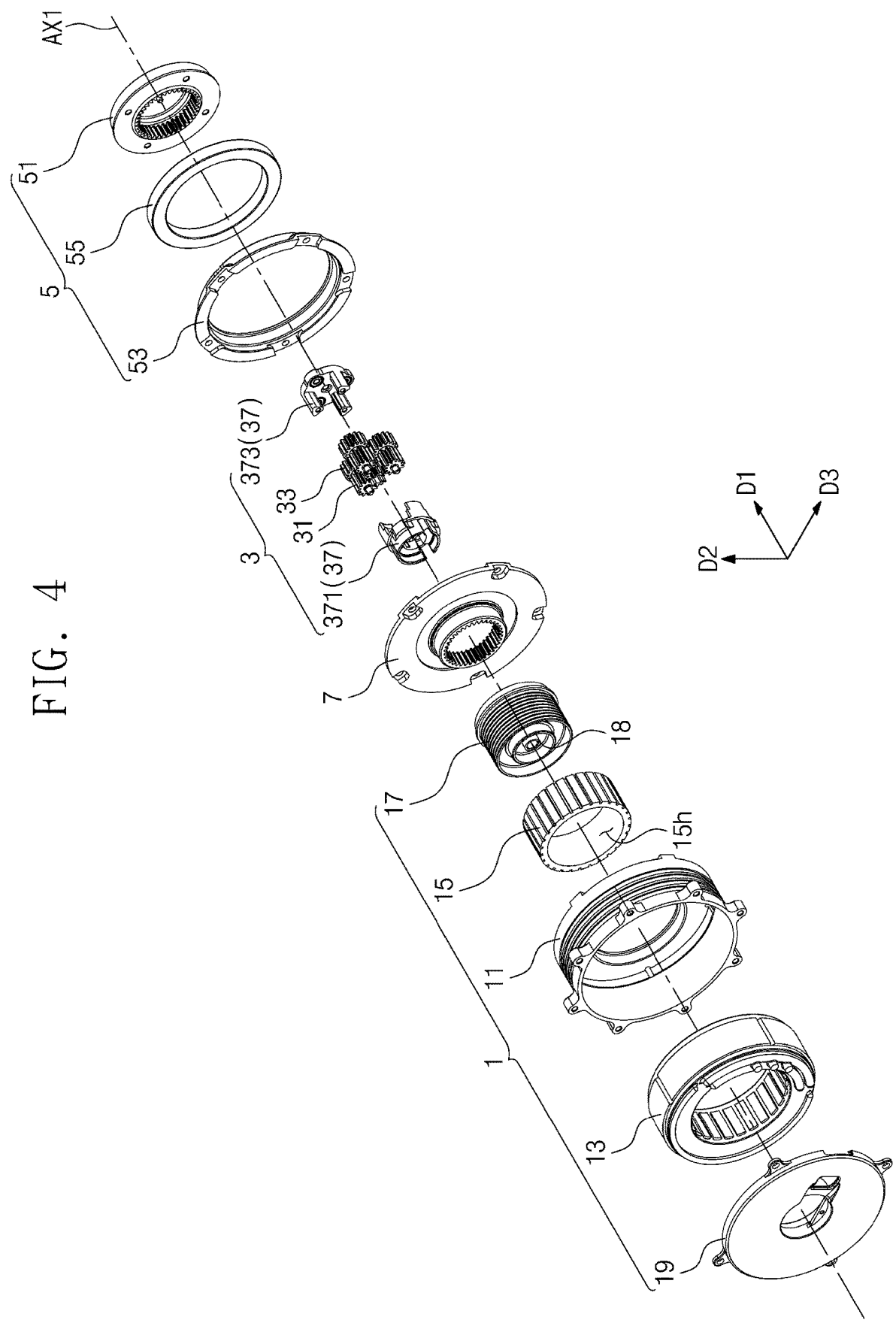
FIG. 4 is an exploded perspective view illustrating the driving module according to embodiments of the inventive concept.

FIG. 4 is an exploded perspective view illustrating the driving module according to embodiments of the inventive concept.

Referring to FIG. 4, the driving source 1 may include a driving source housing 11, a stator 13, a rotor 15, a rotor coupling member 17, a driving shaft 18, and a cap 19.

The driving source housing 11 may surround the stator 13 and/or the rotor 15. Although the driving source housing 11 has a shape symmetric to the axis AX1, the embodiment of the inventive concept is not limited thereto.

The stator 13 may be disposed in the driving source housing 11. The stator 13 may allow the rotor 15 to rotate. More specifically, when electrical energy is applied, the rotor 15 may rotate with respect to the stator 13 by attractive force and/or repulsive force between the stator 13 and the rotor 15. To this end, the stator 13 may include a conductive material and/or a magnet. The stator 13 may have a shape symmetric to the axis AX1 as illustrated in FIG. 4, the embodiment of the inventive concept is not limited thereto.

The rotor 15 may be disposed inside the stator 13. The rotor 15 may rotate with respect to the stator 13. To this end, the rotor 15 may include a conductive material and/or a magnet. The rotor 15 may rotate around the axis AX1. The rotor 15 may provide an inner space 15h. The rotor 15 may have a hollow cylinder shape. An inner empty space of the cylinder shape may be referred to as the inner space 15h. At least a portion of the gear train 3 may be inserted into the inner space 15h. A detailed description thereof will be described later.

The rotor coupling member 17 may be coupled to the rotor 15. At least a portion of the rotor coupling member 17 may be disposed in the inner space 15h. The rotor coupling member 17 may rotate together with the rotor 15. That is, the rotor coupling member 17 may rotate around the axis AX1.

The driving shaft 18 may be connected to the rotor 15. For example, the driving shaft 18 may be coupled to the rotor coupling member 17. The driving shaft 18 may extend in the first direction D1. The axis AX1 may pass through the driving shaft 18. The driving shaft 18 may rotate the gear train 3. More specifically, rotational energy generated from the driving source 1 may be transmitted to the gear train 3 through the driving shaft 18.

The cap 19 may be coupled to the driving source housing 11. Although the cap 19 may have a circular plate shape perpendicular to the first direction D1, the embodiment of the inventive concept is not limited thereto. When the cap 19 is coupled to the driving source housing 11, the stator 13 or the like may be isolated from the outside.

The ring gear assembly 5 may include a ring gear 51, an external housing 53, and a first bearing 55.

The ring gear 51 may be disposed coaxially with the driving source 1. The ring gear 51 may include a sawtooth structure. That is, the sawtooth structure may be disposed on an inner surface of the ring gear 51. The ring gear 51 may rotate around the axis AX1. More specifically, the ring gear 51 may rotate relatively to the driving source housing 11. A detailed description thereof will be described later.

The external housing 53 may surround the ring gear 51. The external housing 53 may be coupled to the driving source housing 11. For example, the external housing 53 may be fixed and coupled to the driving source housing 11. Thus, the ring gear 51 may rotate relatively to the external housing 53.

The first bearing 55 may be disposed between the ring gear 51 and the external housing 53. The ring gear 51 may rotate relatively to the external housing 53 by the first bearing 55.

The gear train 3 may include a first gear set 31, a second gear set 33, and a gear housing 37.

The first gear set 31 may rotate by the driving source 1. To this end, the first gear set 31 may be connected to the driving shaft 18. At least a portion of the first gear set 31 may be inserted into the driving source 1. More specifically, at least a portion of the first gear set 31 may be disposed in the inner space 15*h* of the rotor 15. A detailed description thereof will be described later.

The second gear set 33 may be coupled to the first gear set 31. For example, the second gear set 33 may be coupled to the first gear set 31 at a side opposite to the driving source 1. The second gear set 33 may be disposed at the outside of the driving source 1. That is, the second gear set 33 may be disposed at the outside of the driving source housing 11. The second gear set 33 may rotate by the first gear set 31. A detailed description thereof will be described later.

The gear housing 37 may cover the first gear set 31 and the second gear set 33. The gear housing 37 may include a first gear housing 371 and a second gear housing 373. The first gear housing 371 may be disposed between the first gear set 31 and the driving source 1. The second gear housing 373 may be disposed between the second gear set 33 and the ring gear assembly 5.

Figure 5:
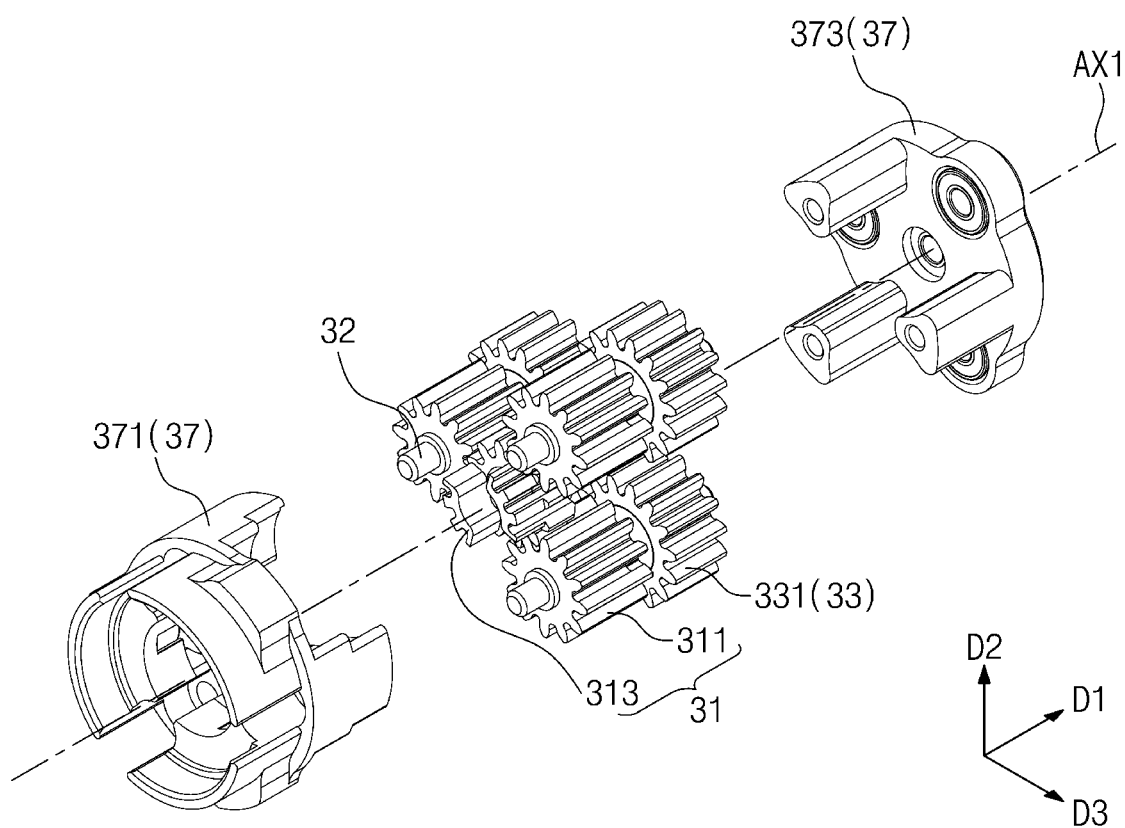
FIG. 5 is an exploded perspective view illustrating a gear train according to embodiments of the inventive concept.

FIG. 5 is an exploded perspective view illustrating the gear train according to embodiments of the inventive concept.

Referring to FIG. 5, the first gear set 31 may include a sun gear 313 and a first planetary gear 311.

The sun gear 313 may be disposed on the axis AX1. The sun gear 313 may rotate on the axis AX1. The sun gear 313 may be coupled to the driving source and rotate by the power transmitted from the driving source 1. For example, the sun gear 313 may be coupled to the driving shaft 18 (refer to FIG. 4) and rotate by the driving shaft 18. The sun gear 313 may rotate with the same RPM with the driving shaft 18.

The first planetary gear 311 may rotate by the power transmitted from the driving source 1. More specifically, the first planetary gear 311 may receive the power from the driving source 1 and revolve around the axis AX1. For example, the first planetary gear 311 may revolve around the sun gear 313 in a state of being engaged with the sun gear 313. At least a portion of the first planetary gear 311 may be inserted into the driving source 1. More specifically, at least a portion of the first planetary gear 311 may be disposed in the inner space 15*h* of the rotor 15. A detailed description thereof will be described later. The first planetary gear 311 may be provided in plurality. For example, as illustrated in FIG. 5, three first planetary gears 311 may be provided. That is, the three first planetary gears 311 may be engaged with one sun gear 311. The plurality of first planetary gears 311 may be spaced apart from each other based on the axis AX1. Hereinafter, however, the first planetary gear 311 will be described in singular form for convenience.

The second gear set 33 may include the second planetary gear 331. The second planetary gear 331 may revolve around the axis AX1. The second planetary gear 331 may be coupled to the first planetary gear 311. More specifically, the second planetary gear 331 may be coupled to the first planetary gear 311 at a side opposite to the driving source 1. In embodiments, the second planetary gear 331 may be fixed and coupled onto the first planetary gear 311. Thus, the second planetary gear 331 may rotate with the first planetary gear 311 in an integrated manner. A revolution speed of the second planetary gear 331 may be substantially the same as or similar to that of the first planetary gear 311. The second planetary gear 331 may be disposed coaxially with the first planetary gear 311. In this case, the second planetary gear 331 may be connected to the first planetary gear 311 by a gear connection shaft 32. A detailed description thereof will be described later. The second planetary gear 331 may be provided in plurality. For example, as illustrated in FIG. 5, three second planetary gears 331 may be provided. The plurality of second planetary gears 331 may be spaced apart from each other based on the axis AX1. Hereinafter, however, the second planetary gear 331 will be described in singular form for convenience.

Figure 6:
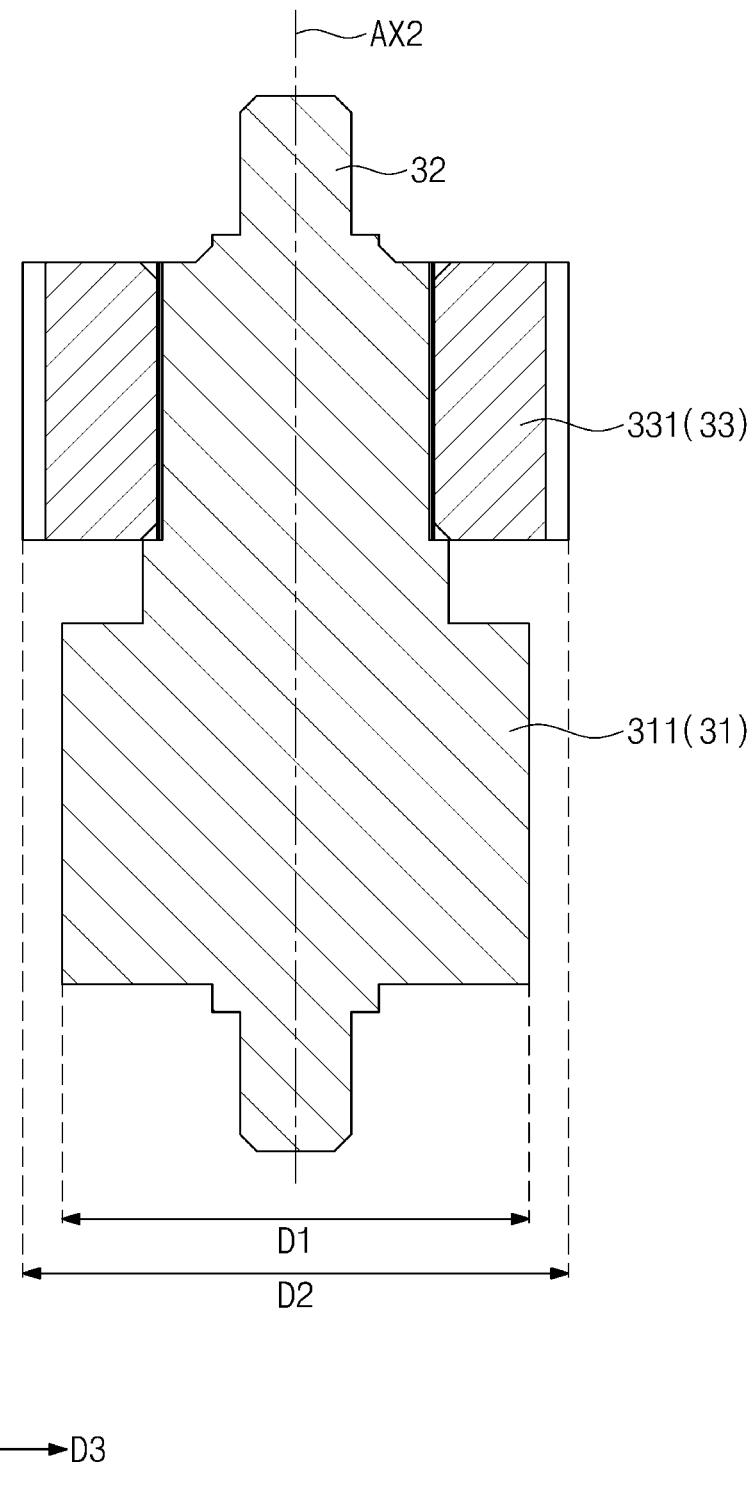
FIG. 6 is a cross-sectional view illustrating the gear train according to embodiments of the inventive concept.

FIG. 6 is a cross-sectional view illustrating the gear train according to embodiments of the inventive concept.

Referring to FIG. 6, the first planetary gear 311 and the second planetary gear 331 may be disposed coaxially with each other. More specifically, all of the first planetary gear 311 and the second planetary gear 331 may be disposed on a gear axis AX2. The first planetary gear 311 and the second planetary gear 331 may be connected by the gear connection shaft 32.

In embodiments, as illustrated in FIG. 6, the first planetary gear 311 and the gear connection shaft 32 may be integrated with each other. However, the embodiment of the inventive concept is not limited thereto. For example, the first planetary gear 311 and the gear connection shaft 32 may be separately provided and then coupled with each other. Alternatively, the second planetary gear 331 and the gear connection shaft 32 may be integrated with each other. Alternatively, all of the first planetary gear 311, the second planetary gear 331, and the gear connection shaft 32 may be integrated with each other.

A diameter of the first planetary gear 311 may be referred to as a first diameter D1. A diameter of the second planetary gear 331 may be referred to as a second diameter D2. The second diameter D2 may be greater than the first diameter D1. That is, the diameter of the second planetary gear 331 may be greater than that of the first planetary gear 311. In this specification, the term "a diameter of a gear" may represent a diameter of a pitch-circle of a gear. However, the embodiment of the inventive concept is not limited thereto. For example, a diameter of a gear may represent a maximum diameter to an outer surface of a sawtooth of a gear.

Figure 7:
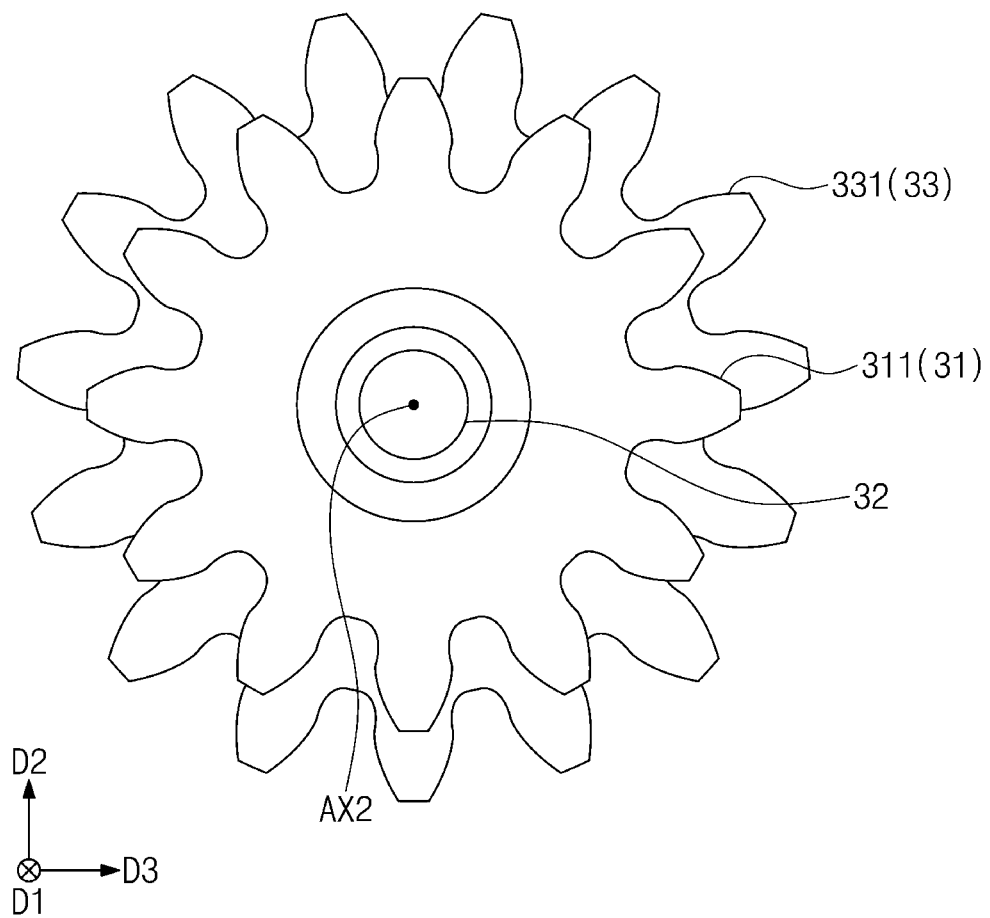
FIG. 7 is a bottom view illustrating the gear train according to embodiments of the inventive concept.

FIG. 7 is a bottom view illustrating the gear train according to embodiments of the inventive concept.

Referring to FIG. 7, the number of sawteeth of the second planetary gear 331 may be greater than that of sawteeth of the first planetary gear 311. For example, as illustrated in FIG. 7, the number of the sawteeth of the second planetary gear 331 may be 15. In this case, the number of the sawteeth of the first planetary gear 311 may be 12. However, the embodiment of the inventive concept is not limited thereto. For example, the number of the sawteeth may be different based on a specific design.

Figure 8:
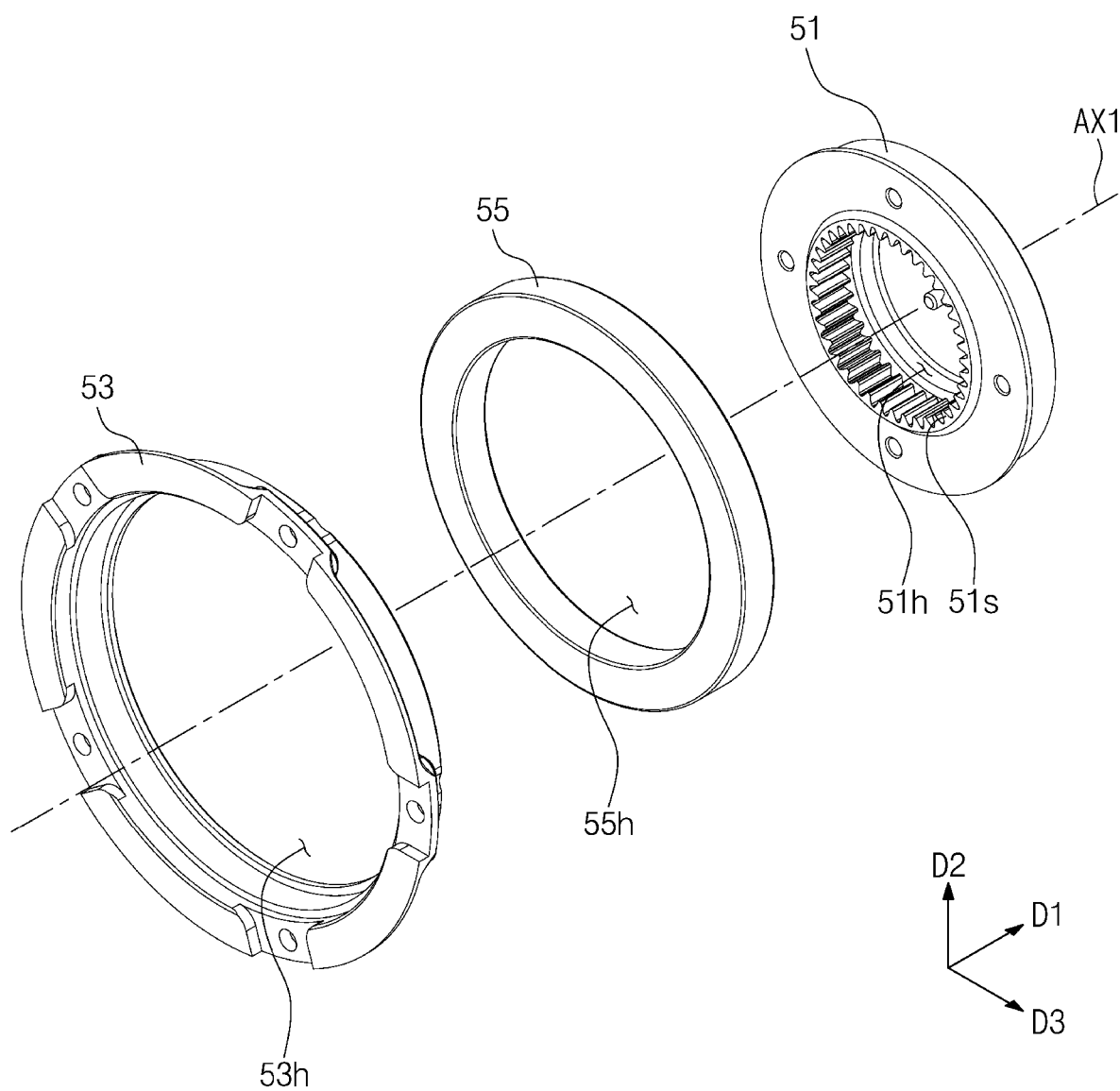
FIG. 8 is an exploded perspective view illustrating a portion of the driving module according to embodiments of the inventive concept.

FIG. 8 is an exploded perspective view illustrating a portion of the driving module according to embodiments of the inventive concept.

Referring to FIG. 8, the ring gear 51 may provide a ring gear through-hole 51*h*. A sawtooth structure 51*s* may be provided on the inner surface of the ring gear 51, which defines the ring gear through-hole 51*h*. The second planetary gear 331 (refer to FIG. 5) may be engaged with the sawtooth structure 51*s*. The ring gear 51 may rotate around the axis AX1 by the second planetary gear 331.

The external housing 53 may surround the ring gear 51. The external housing 53 may provide an external housing through-hole 53*h*. The ring gear 51 may be disposed in the external housing through-hole 53*h*.

The first bearing 55 may provide a first bearing through-hole 55*h*. The ring gear 51 may be disposed in the first bearing through-hole 55h. The ring gear 51 may rotate relatively to the external housing 53 by the first bearing 55.

Figure 9:
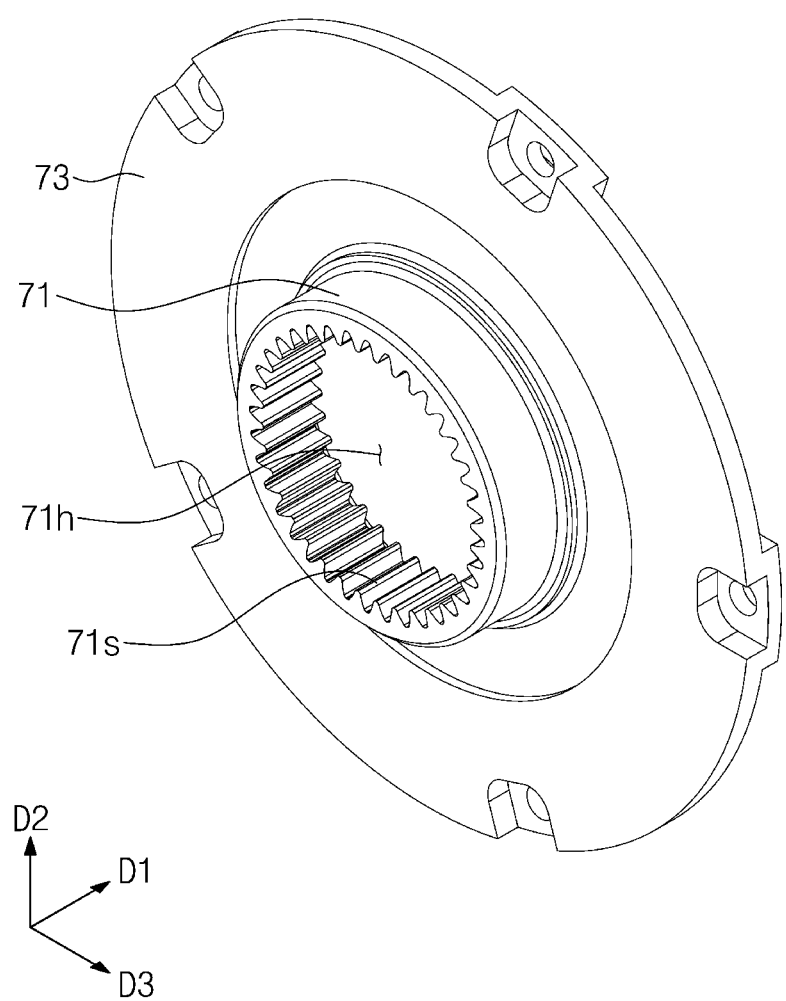
FIG. 9 is an exploded perspective view illustrating a portion of the driving module according to embodiments of the inventive concept.

FIG. 9 is an exploded perspective view illustrating a portion of the driving module according to embodiments of the inventive concept.

Referring to FIG. 9, the intermediate ring gear 7 may include an intermediate gear body 71 and an intermediate plate 73.

The intermediate plate 73 may provide an arrangement hole through which the axis AX1 (refer to FIG. 1) passes. The intermediate gear body 71 may be disposed in the arrangement hole.

The intermediate gear body 71 may be coupled to an inner side of the intermediate plate 73. The intermediate gear body 71 may have a cylinder shape extending in the first direction D1. The intermediate gear body 71 may be engaged with the first planetary gear 311 (refer to FIG. 4). The intermediate gear body 71 may provide an intermediate ring gear through-hole 71h through which the axis AX1 (refer to FIG. 3) passes. An intermediate sawtooth structure 71s may be provided on an inner surface of the intermediate gear body 71, which defines the intermediate ring gear through-hole 71h. The intermediate sawtooth structure 71s may be engaged with the first planetary gear 311. At least a portion of the intermediate gear body 71 may be inserted into the rotor 15 (refer to FIG. 4). The intermediate gear body 71 may have a diameter equal to or less than that of the inner space 15h. More specifically, an outer diameter of the intermediate gear body 71 may be equal to or less than an inner diameter of the rotor 15. Thus, at least a portion of the intermediate gear body 71 may be disposed in the inner space 15h.

Figure 10:
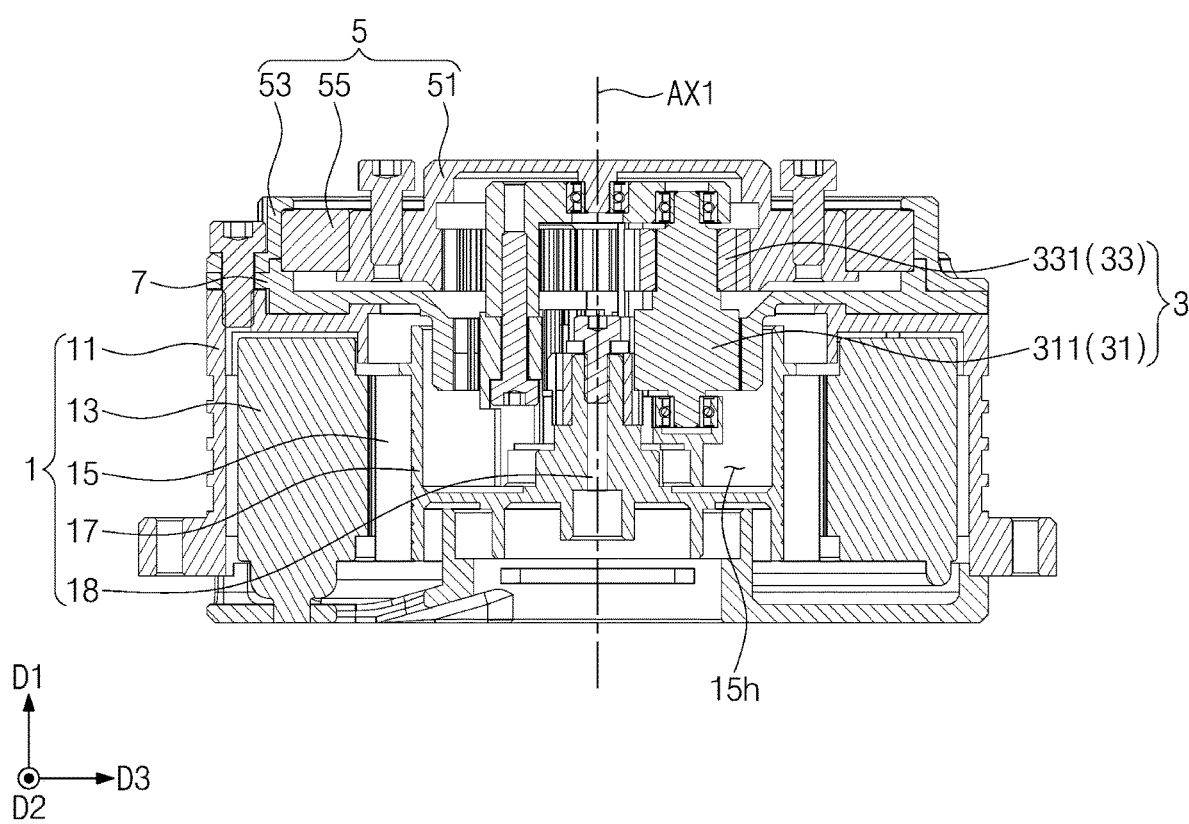
FIG. 10 is a cross-sectional view illustrating the driving module according to embodiments of the inventive concept.
Figure 11:
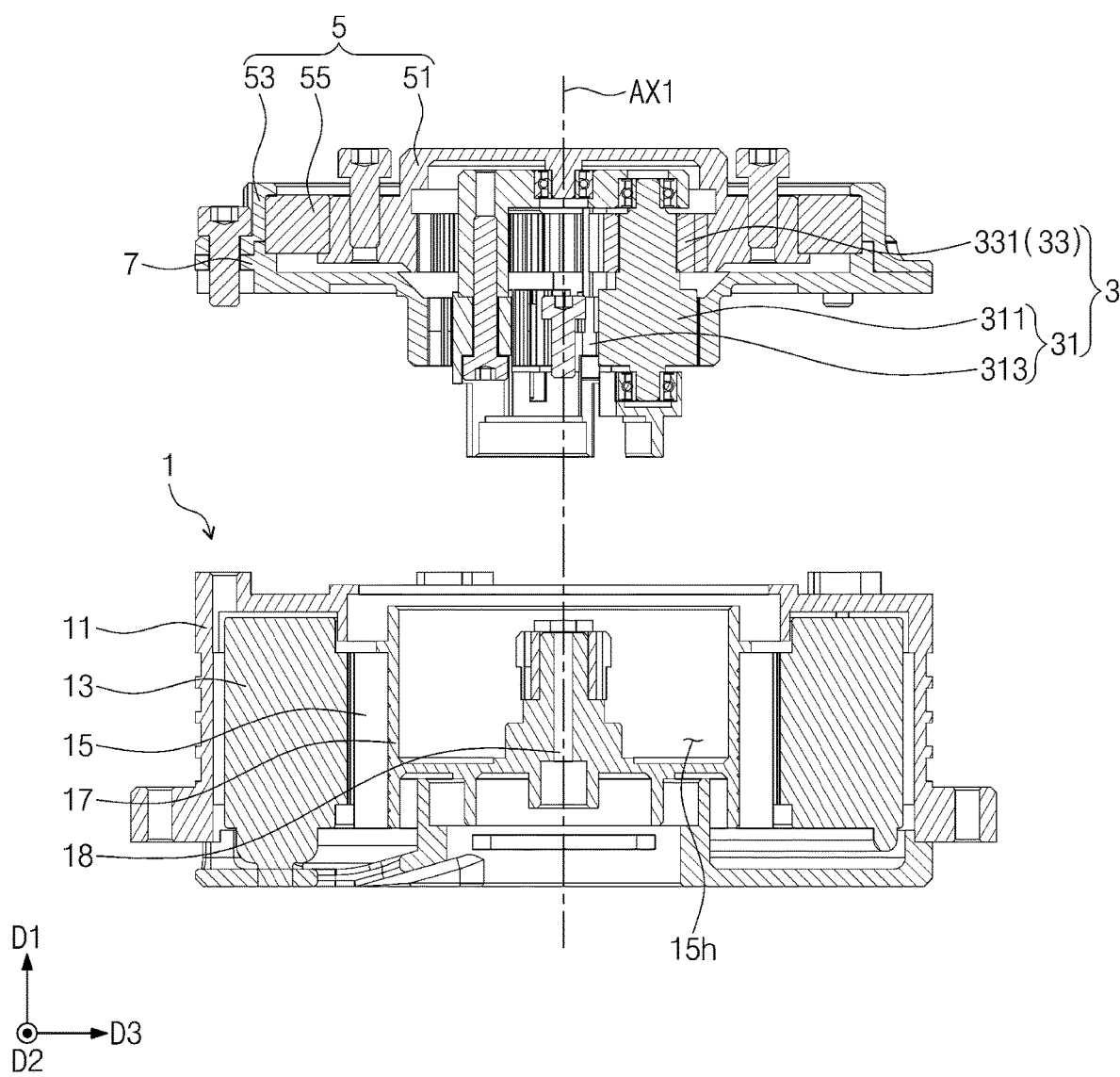
FIG. 11 is an exploded cross-sectional view illustrating the driving module according to embodiments of the inventive concept.

FIG. 10 is a cross-sectional view illustrating the driving module according to embodiments of the inventive concept, and FIG. 11 is an exploded cross-sectional view illustrating the driving module according to embodiments of the inventive concept.

Referring to FIGS. 10 and 11, at least a portion of the first gear set 31 may be inserted into the rotor 15. That is, at least a portion of the first planetary gear 311 may be disposed in the inner space 15h. Also, at least a portion of the intermediate ring gear 7 may be disposed in the inner space 15h. On the other hand, the second gear set 33 may be disposed at the outside of the driving source 1. That is, the second gear set 331 may be disposed at the outside of the driving source 15.

The intermediate ring gear 7 may be fixed and coupled to the driving source housing 11. For example, the external housing 53 may be fixed and coupled to the driving source housing 11. The first planetary gear 311 may revolve around the axis AX1. More specifically, the first planetary gear 311 may revolve around the sun gear 313 in a state of being engaged with the intermediate ring gear 7. The second planetary gear 331 may revolve around the axis AX1 together with the first planetary gear 311. The second planetary gear 331 may be engaged with the ring gear 51. Thus, the ring gear 51 may rotate by the revolution of the second planetary gear 331.

The driving module and the motion assist apparatus including the same according to the embodiments of the inventive concept may provide the driving source and the reduction gear, which are integrated with each other. Thus, a volume of the entire driving module may be reduced. Thus, the driving module may be miniaturized and/or lightened. When the motion assist apparatus is miniaturized and lightened, a load applied to a human body may be reduced.

The driving module and the motion assist apparatus including the same according to the embodiments of the inventive concept may reduce the power transmitted from the driving source by using 2-stage planetary gears. Thus, the high reduction gear ratio may be obtained. Here, the first planetary gear may be smaller than the second planetary gear. Thus, as at least a portion of the first planetary gear is inserted into the driving source, the volume of the driving module may be reduced. Also, since the number of the sawteeth of the second planetary gear is greater than that of the sawteeth of the first planetary gear, the high reduction gear ratio may be obtained. A target reduction gear ratio may be easily obtained by using the 2-stage planetary gears. That is, the driving module according to the embodiments of the inventive concept may obtain the high reduction gear ratio while reducing the volume and weight thereof.

The driving module and the motion assist apparatus including the same according to the embodiment of the inventive concept may be reduced in volume and miniaturized.

The driving module and the motion assist apparatus including the same according to the embodiment of the inventive concept may be reduced in weight.

The driving module and the motion assist apparatus including the same according to the embodiment of the inventive concept may obtain the high reduction gear ratio.

The effects of the present invention are not limited to the aforementioned effects, but other objects not described herein will be clearly understood by those skilled in the art from descriptions below.

Although the embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. A driving module comprising:
a driving source configured to generate power;
a ring gear disposed coaxially with the driving source; and
a gear train disposed between the driving source and the ring gear,
wherein the gear train comprises:
a first gear set of which at least a portion is inserted into the driving source; and
a second gear set,
wherein the first gear set comprises:
a sun gear coupled to the driving source to rotate by power transmitted from the driving source; and
a first planetary gear engaged with the sun gear to revolve around the sun gear,
wherein the second gear set comprises a second planetary gear fixed and coupled onto the first planetary gear at a side opposite to the driving source,
wherein the second planetary gear is engaged with the ring gear, and
wherein the second planetary gear has a diameter greater than that of the first planetary gear.

2. The driving module of claim 1, wherein the first planetary gear and the second planetary gear are disposed coaxially with each other.

3. The driving module of claim 1, wherein the number of sawteeth of the second planetary gear is greater than that of sawteeth of the first planetary gear.

4. The driving module of claim 1, wherein the driving source comprises:
a driving source housing;
a stator disposed in the driving source housing;

a rotor disposed in the stator to provide an inner space through which an axis passes; and a driving shaft disposed in the inner space and connected to the rotor to rotate, wherein at least a portion of the first gear set is disposed in the inner space, and the sun gear is coupled to the driving shaft to rotate.

5. The driving module of claim 4, further comprising an intermediate ring gear disposed between the driving source and the ring gear and fixed and coupled to the driving source housing, wherein the first planetary gear is engaged with the intermediate ring gear.

6. The driving module of claim 5, wherein the intermediate ring gear comprises:

an intermediate plate that provides an arrangement hole through which the axis passes; and an intermediate gear body that is coupled to an inner side of the intermediate plate and provides an intermediate sawtooth structure engaged with the first planetary gear, wherein the intermediate gear body has a diameter equal to or less than that of the inner space, and at least a portion of the intermediate gear body is inserted into the inner space.

7. The driving module of claim 4, further comprising:

an external housing disposed coaxially with the ring gear to surround the ring gear; and a first bearing disposed between the external housing and the ring gear, wherein the external housing is fixed and coupled to the driving source housing.

8. The driving module of claim 1, wherein each of the first planetary gear and the second planetary gear is provided in plurality.

9. A motion assist apparatus comprising:

a fixing module fixed to one portion of a body of a user;

a support module configured to support the other portion of the body of the user and rotate with respect to the fixing module; and a driving module having one side coupled to the fixing module and the other side coupled to the support module, wherein the driving module comprises:

a driving source; and a gear train coupled to the driving source, wherein the gear train comprises:

a first gear set of which at least a portion is inserted into the driving source; and a second gear set disposed at the outside of the driving source, wherein the first gear set comprises:

a sun gear coupled to the driving source coaxially with the driving source; and a first planetary gear configured to revolve around the sun gear, and wherein the second gear set comprises a second planetary gear coupled onto the first planetary gear at a side opposite to the driving source.

10. The motion assist apparatus of claim 9, wherein the driving module further comprises a ring gear disposed coaxially with the driving source, wherein the second planetary gear is engaged with the ring gear, and the support module is fixed and coupled to the ring gear.

11. The motion assist apparatus of claim 10, wherein the driving source comprises:

a driving source housing;

a stator disposed in the driving source housing;

a rotor disposed in the stator to provide an inner space through which an axis passes; and a driving shaft disposed in the inner space and connected to the rotor to rotate, wherein the fixing module is fixed and coupled to the driving source housing.

12. The motion assist apparatus of claim 11, wherein at least a portion of the first gear set is disposed in the inner space, and the sun gear is coupled to the driving shaft to rotate.

13. The motion assist apparatus of claim 11, further comprising:

an external housing disposed coaxially with the ring gear to surround the ring gear; and a first bearing disposed between the external housing and the ring gear, wherein the external housing is fixed and coupled to the driving source housing.

14. The motion assist apparatus of claim 11, wherein the driving module further comprises an intermediate ring gear disposed between the driving source and the ring gear and fixed and coupled to the driving source housing, wherein the first planetary gear is engaged with the intermediate ring gear.

15. The motion assist apparatus of claim 9, wherein the second planetary gear has a diameter greater than that of the first planetary gear.

16. A driving module comprising:

a driving source having an axis extending in a first direction;

a ring gear configured to rotate around the axis; and a gear train disposed between the driving source and the ring gear, wherein the gear train comprises:

a first planetary gear of which at least a portion is inserted into the driving source; and a second planetary gear coupled onto the first planetary gear at a side opposite to the driving source, wherein the first planetary gear revolves around the axis by the driving source, and the second planetary gear is engaged with the ring gear to revolve around the axis together with the first planetary gear wherein the second planetary gear has a diameter greater than that of the first planetary gear.

17. The driving module of claim 16, wherein the driving source comprises:

a driving source housing;

a stator disposed in the driving source housing;

a rotor configured to rotate with respect to the stator and provide an inner space through which the axis passes; and a driving shaft extending in the first direction on the axis, wherein at least a portion of the first planetary gear is disposed in the inner space, and the first planetary gear revolves around the driving shaft.

18. The driving module of claim 17, further comprising an intermediate ring gear disposed between the driving source and the ring gear and fixed and coupled to the driving source housing, wherein the first planetary gear is engaged with the intermediate ring gear.

* * * * *